May 12, 1925.
H. W. PARTLOW
GAS HEATER GOVERNOR
Filed Nov. 26, 1923
1,537,134
2 Sheets-Sheet 1
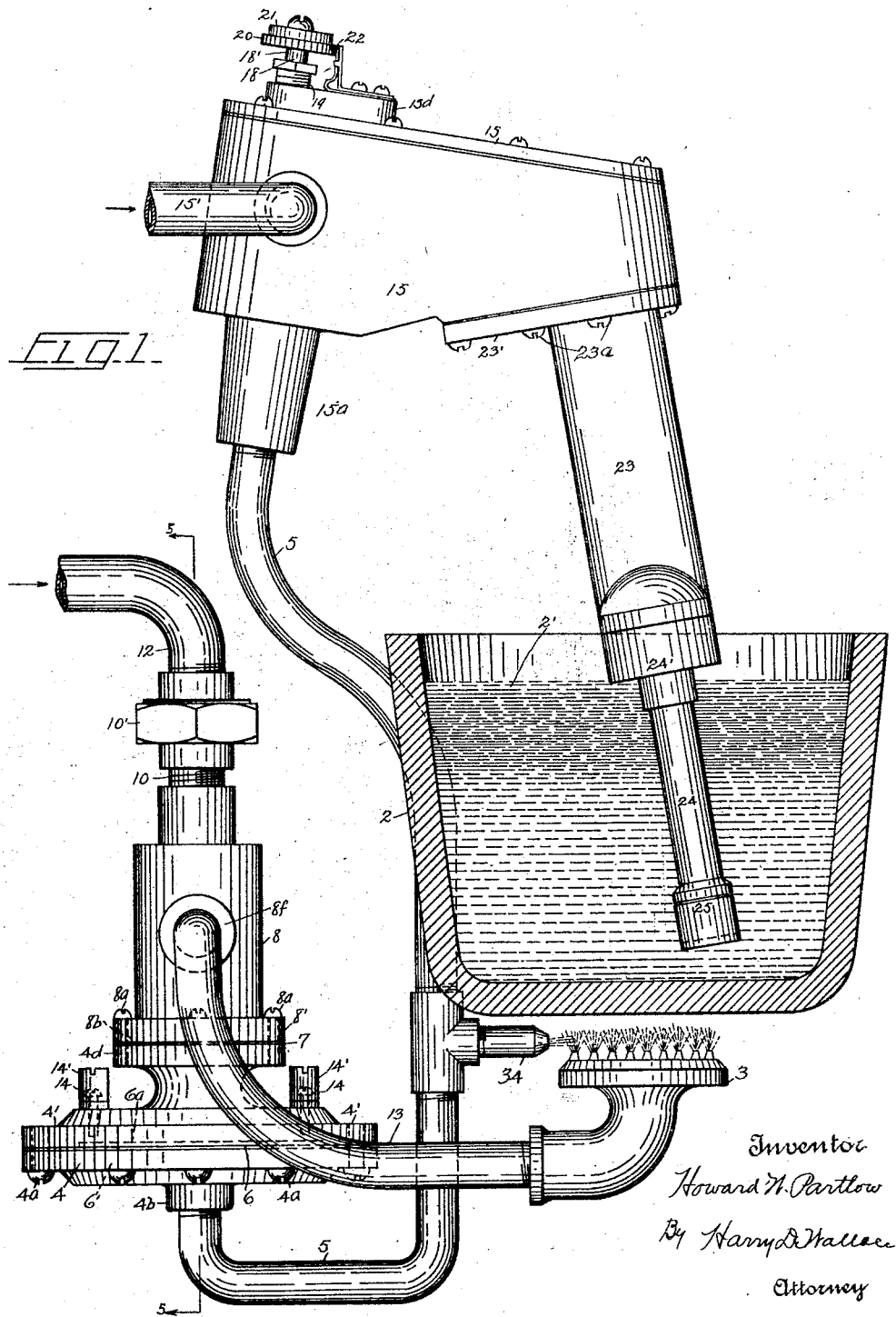

May 12, 1925.  1,537,134
H. W. PARTLOW
GAS HEATER GOVERNOR
Filed Nov. 26, 1923  2 Sheets-Sheet 2
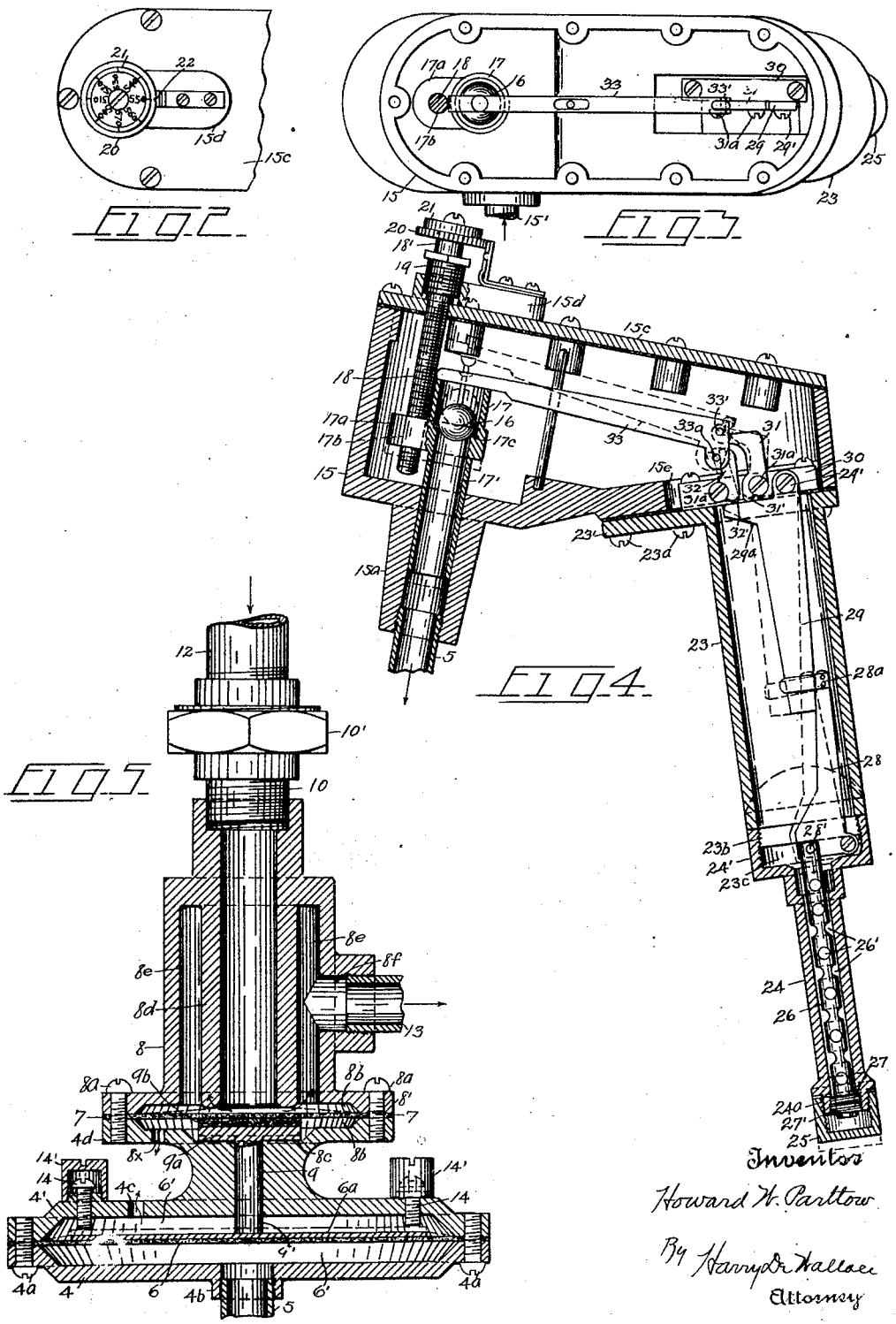

Patented May 12, 1925.

1,537,134

UNITED STATES PATENT OFFICE.

HOWARD WEBSTER PARTLOW, OF UTICA, NEW YORK.

GAS-HEATER GOVERNOR.

Application filed November 26, 1923. Serial No. 676,969.

*To all whom it may concern:*

Be it known that I, HOWARD WEBSTER PARTLOW, a citizen of the United States, residing at Utica, in the county of Oneida and State of New York, have invented certain new and useful Improvements in Gas-Heater Governors, of which the following is a specification.

This invention relates to thermostatic control for gas-heated melting-pots, water-heaters, and the like, and has for its object to provide a novel thermostatic governor which is equipped with a valve that controls a fluid-pressure medium, by which the fuel-valve is operated. A further object is to provide a novel fuel-valve which comprises two diaphragms of different size, wherein the larger diaphragm is operated by the fluid-pressure derived from the thermostatic governor, and the smaller diaphragm is operated by the larger diaphragm and controls the flow of the fuel-gas towards the burner. A further object is to provide means for maintaining a pilot light for igniting the burner. A further object is to provide means for gaging the closing movement of the fuel-gas valve. And a particular object is to provide a governor for gas-heaters which is arranged to control fuel-gas when the latter is delivered to the heater at pressures higher than normal.

I attain these objects by the means set forth in the detailed description which follows, and as illustrated by the accompanying drawings, in which—

Figure 1 is a diagrammatic elevational view of the thermostatic governor and fuel-valve applied to a melting-pot, the latter being in section. Fig. 2 is a fragmentary view of the governor, showing the dial. Fig. 3 is a top plan view of the governor with the cover removed. Fig. 4 is a central vertical section, showing the construction and arrangement of the thermostatic governor and related parts. And Fig. 5 is a similar sectional view of the fuel-gas valve, taken on line 5—5 of Fig. 1.

In the drawings, 2 represents a melting-pot filled with molten metal 2'. 3 is an ordinary gas-burner, by which the pot 2 is heated, the gas therefor being supplied by a valve, which consists of a hollow circular base 4, upon which is mounted a correspondingly shaped portion 4', the said parts being fastened together by screws $4^a$. The base 4 has a central outlet $4^b$, which is tapped by a pipe 5. Between the parts 4—4' is disposed a relatively large circular diaphragm 6, whose edges are tightly clamped between the flanges of said parts, as best seen in Fig. 5. The diaphragm 6 divides a chamber 6', and its top face is partially overlaid by a metal disc $6^a$, for stiffening the medial portion of the diaphragm. The part 4' is provided with a vent $4^c$, for ventilating the chamber 6' above the diaphragm. Above and concentric to the diaphragm 6 is disposed a second and smaller diaphragm 7, the latter being clamped between chambered circular portions $4^d$, preferably an integral part of the portion 4', and a correspondingly shaped portion 8', which forms the base of an upright cylindrical body 8. The diaphragm 7 and the parts $4^d$—8' are held in place by screws $8^a$. The diaphragm 7 spans and divides a circular chamber $8^b$, and is raised by means of a piston or plunger 9, which is reciprocatable vertically between the diaphragms 6 and 7. The stem 9' of the plunger rests upon the diaphragm 6, and its top end is enlarged into a disc $9^a$, which rests upon a ledge $8^c$, when the diaphragm 6 is relaxed, as shown in Fig. 5. The top face of the disc $9^a$ is covered by a disc $9^b$ preferably made of felt or rubber, which makes direct contact with the underside of diaphragm 7. Above the diaphragm 7 the body 8 is formed with a smaller concentric cylinder $8^d$, whose lower end is open and registers with the discs $9^a$—$9^b$. The top of the chamber $8^d$ is threaded for receiving a threaded nipple 10, upon which is mounted an ordinary union 10', which in turn connects with a main fuel-gas supply pipe 12. The fuel-gas enters the chamber $8^d$, and when the diaphragms 6 and 7 are in the positions shown in full lines in Fig. 5, the gas flows from the lower end of chamber $8^d$ into an annular chamber $8^e$, from which the gas passes through an outlet $8^f$, and is carried towards the burner 3 by a pipe 13. The portion of the chamber $8^b$ lying below the diaphragm 7 is ventilated by a normally open vent $8^x$. The diaphragm 6 is raised by fluid pressure admitted to the chamber 6', beneath diaphragm 6, and the latter forces the plunger 9 upwardly for correspondingly lifting the diaphragm 7 and closing the lower end of the passage $8^d$. This shuts off the flow of the gas to the burner and extinguishes the flame by which the pot 2 is heated. The total extinguishment of the burner may be prevented by means of a number of stops, which consist of screws 14, which are adjustable in threaded holes formed in the part 4'; the free lower ends of the screws being arranged to engage the top side of the plate 6ª (see Fig. 5). The stops 14 are preferably protected by screw-caps 14'. The diaphragm 6 is preferably considerably larger in diameter than the diaphragm 7, so as to ensure adequate power for positively seating the valve 7, especially when the fuel-gas is supplied at greater than normal pressures.

My double diaphragm valve is controlled by a thermostatic governor, which will now be described: 15 represents the hollow body of the governor, which is supplied with gas or air, by a pipe 15', the gas being discharged from the body through the pipe 5, which conducts the fluid pressure to the cavity 6' beneath the diaphragm 6, for operating the two diaphragms, as explained. The outflow of the fluid pressure from the body 15 is controlled by a spherical valve 16, which is disposed in a tubular part 17, the latter having a hollow stem 17', which is adjustably disposed in the bore of a depending portion 15ª of the body, to which the pipe 5 is attached. The part 17 has an arm 17ª, which is provided with a threaded hole 17ᵇ, in which is disposed a relatively long screw 18, by which the part 17 may be lowered and raised relatively to the valve 16, as shown by the full and dotted lines in Fig. 4. Within the enlarged top end of the part 17 is formed an annular seat 17ᶜ for the valve 16. By moving the seat towards and away from the ball 16 correspondingly quickens or retards the opening and closing actions of the valve, and accordingly varies the range of temperatures of the melting-pot or other device. The screw 18 has an enlarged top end 18', which is supported by the cover 15ᶜ of the body. The head 18' is rotatable in a bushing 19, which screws into a boss 15ᵈ of the cover, and its extreme top end is fitted with a disc 20, the latter having a milled edge for facilitating manipulation of the screw. Upon the disc 20 is mounted a dial 21, which preferably bears degree numerals within a certain range, as best seen in Fig. 2. When a certain number on the dial is positioned opposite a pointer 22, the valve 16 will automatically open or close when the temperature of the contents of the pot 2 corresponds with the said number.

The valve 16 is controlled by a thermostatic device, which comprises the following parts: 23 represents an elongated metal leg or part, which is hollow throughout, and whose top end is formed with a flange 23', by which it is secured to the bottom face of the body 15, by screws 23ª. The bottom of the body 15 has an opening 15ª, which registers with the chamber of the part 23. The lower end of the leg 23 is threaded, as at 23ᵇ, and below the threads the leg is formed with a vertical ledge 23ᶜ. The thermostatic element proper consists of a tube 24, which alone is usually submerged in the molten metal 2' (see Figs. 1 and 4). The top end of the tube 24 is formed with a bell 24', which is internally threaded for screwing on to the portion 23ᵇ of the leg. The lower end of tube 24 is provided with an internally and externally threaded portion 24ª, the said end being closed and sealed by a cap 25. Within the tube 24 is disposed a rod 26, preferably comprising a metal of extremely low or no expansibility, the said rod being perforated, as at 26', for rendering the same practically non-expansible. The lower end of the rod 26 is threaded and is fitted with a nut 27, which is screwed on to the rod until it engages an adjacent shoulder of the tube. Then a locking nut 27' is screwed into the open end of the tube for holding the rod and nut 27 rigidly in place. The top end of the rod 26 is forked, and is pivoted to the lower end of a lever 28, by a pin 28'. The lever 28 then extends upwardly towards the middle of the leg, and its top end is fitted with a fork 28ª, which straddles the lower end of a similar but inverted lever 29, the latter being pivoted by a screw 29' to a block 30, which is rigid on the flange 23' of the leg. The top end of lever 29 is provided with a laterally extending arm 29ª. Upon the block 30 is pivotally mounted a pair of dogs 31 and 32, by screws 31ª; the said dogs having similar ball portions 31' and 32', which normally engage the top edge of the arm 29ª of lever 29, in such manner that when the lower end of lever 29 is moved towards the left, as indicated by the dotted lines in Fig. 4, the arm 29ª swings upwardly and rocks the top ends of the dogs away from each other. The dogs 31—32 support one end of a relatively long valve lever 33, and for this purpose said lever is provided with pins 33' and 33ª, which are respectively engaged by a hook 31ᵇ of dog 31, and by the outer edge of dog 32. The spreading of the dogs simultaneously moves the pin 33' towards the right and pin 33ª towards the left. This tilts the free end of lever 33, to which the valve 16 is suspended, upwardly for raising and opening the valve. Through the several connections last described, the expansion of the tube 24 effects the opening of the valve 16, and allows the fluid pressure to flow from the body 15, via pipe 5, into the bottom of the chamber 6', for raising the two diaphragms 6 and 7 and shutting off the fuel-gas at the passage 8ᵈ. This action of the governor and fuel valve is effected whenever the temperature of the contents of the pot 2 rises above the predetermined degree indicated by the dial 21. When however, the temperature of the melting-pot falls below the predetermined degree, the tube 24 contracts and by reason of the rigid connection of the tube with the rod 26, effects the reversal of the levers 28—29—33, which allows the valve 16 to become seated, for shutting off the supply of fluid pressure to the chamber 6'. Following each closing of the valve 16, the gas confined in the pipe 5 and chamber 6' wastes through a small nozzle 34, which comprises a pilot burner. The stoppage of the flow of gas from the governor 15 to the chamber 6', allows the two diaphragms to gravitate to their normal positions, shown by the full lines in Fig. 5. This permits the fuel gas to flow from chamber $8^d$ into chamber $8^e$, and thence through pipe 13 to the burner 3, for restoring the temperature of the melting-pot. The replenishing of the contents of the pot 2, generally instantly lowers the temperature several degrees, and effects sequentially the contraction of the element 24, the closing of the valve 16, the opening of the valve 7, and the relighting of the burner 3, as explained. The thermostat 24—26 and related parts are so arranged that, the rise or fall of temperature of the melting-pot to the extent of one-half a degree effects the almost instant closing and opening of the fuel-valve 7.

While I have shown and described my gas heater governor applied to a melting-pot, it is obvious that it is equally applicable to other forms of heaters and to the heating of a medium other than metal.

Having thus described my invention, what I claim, is—

1. The combination with a melting-pot, of a gas-burner for heating said pot, a thermostat, a valve adapted to dispense fluid-pressure operated by the thermostat, a fuel-gas valve comprising a diaphragm, a plunger for operating said diaphragm, a second and larger diaphragm for actuating said plunger, said second diaphragm adapted to be moved in one direction by the fluid pressure, and adjustable means for limiting the movement of the second diaphragm to vary the flow of gas to the burner.

2. The combination with a melting-pot, a burner for heating said pot, and a source of fluid pressure, of a valve chamber communicating with the fluid pressure, a valve in the chamber for controlling the flow of pressure through the chamber, a thermostat for operating said valve, said thermostat communicating with the chamber and extending down into the melting pot, a fuel-gas valve comprising a diaphragm, a piston for operating said diaphragm, a larger diaphragm for operating said piston in the direction for closing the fuel-gas valve, said larger diaphragm adapted to be operated by the fluid pressure, and adjustable stop-screw means for limiting the flexing of said larger diaphragm to control the supply of gas to the burner through the fuel-gas valve.

In testimony whereof I affix my signature.

HOWARD WEBSTER PARTLOW.